United States Patent
Walker et al.

(10) Patent No.: US 12,075,726 B2
(45) Date of Patent: Sep. 3, 2024

(54) STALK ROLLER ASSEMBLY FOR AN AGRICULTURAL SYSTEM

(71) Applicant: CNH Industrial America LLC, New Holland, PA (US)

(72) Inventors: Eric Lee Walker, Narvon, PA (US); Eric Roland Fredricks, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 372 days.

(21) Appl. No.: 17/476,146

(22) Filed: Sep. 15, 2021

(65) Prior Publication Data
US 2022/0000027 A1    Jan. 6, 2022

Related U.S. Application Data

(62) Division of application No. 15/883,609, filed on Jan. 30, 2018, now Pat. No. 11,122,741.

(51) Int. Cl.
| | |
|---|---|
| *A01D 45/02* | (2006.01) |
| *A01D 34/44* | (2006.01) |
| *A01D 41/12* | (2006.01) |
| *A01D 47/00* | (2006.01) |
| *A01F 11/06* | (2006.01) |

(52) U.S. Cl.
CPC ........... *A01D 45/025* (2013.01); *A01D 34/44* (2013.01); *A01D 41/12* (2013.01); *A01D 47/00* (2013.01); *A01F 11/06* (2013.01)

(58) Field of Classification Search
CPC .............................. A01D 45/025; A01D 45/02
See application file for complete search history.

(56) References Cited

U.S. PATENT DOCUMENTS

| | | | | |
|---|---|---|---|---|
| 1,382,264 | A | * | 6/1921 | Baird ................... A01D 45/025 460/30 |
| 1,641,436 | A | * | 9/1927 | Jett ....................... A01D 45/025 460/36 |
| 1,641,682 | A | * | 9/1927 | Kruse .................. A01D 45/025 460/29 |
| 1,647,936 | A | * | 11/1927 | Schuld ................. A01D 45/025 56/103 |

(Continued)

FOREIGN PATENT DOCUMENTS

| | | |
|---|---|---|
| BR | 132018005344 E2 | * 10/2019 |
| BR | 102019006556 A2 | * 10/2020 |

(Continued)

OTHER PUBLICATIONS

EP Application No. 19153829.7, Extended Search Report, dated May 17, 2019, 6 pgs.

*Primary Examiner* — Adam J Behrens
*Assistant Examiner* — Ashley A Kaercher
(74) *Attorney, Agent, or Firm* — Peter K. Zacharias; Rebecca L. Henkel; Rickard K. DeMille

(57) ABSTRACT

A stalk roller assembly for an agricultural system includes a stalk roller having a hollow shaft. The hollow shaft has a first end having a first shape, such that the first end engages a guide element. Furthermore, the hollow shaft has a second end having a second shape that engages a drive shaft, such that the first shape is different than the second shape. In addition, the hollow shaft is formed from a single piece of material.

20 Claims, 6 Drawing Sheets

(56) References Cited

U.S. PATENT DOCUMENTS

| | | | | |
|---|---|---|---|---|
| 1,736,347 A * | 11/1929 | Keeler | A01D 45/025 | 460/32 |
| 1,764,686 A * | 6/1930 | Kuhlman | A01D 45/025 | 460/36 |
| 2,178,013 A * | 10/1939 | Blank | A01D 45/025 | 460/29 |
| 2,180,594 A * | 11/1939 | Kuhlman | A01D 45/025 | 56/33 |
| 2,315,950 A * | 4/1943 | Fitzloff | A01D 45/025 | 460/32 |
| 2,337,702 A * | 12/1943 | White, Jr. | A01F 11/06 | 460/31 |
| 2,534,685 A * | 12/1950 | Shrader | A01D 45/025 | 460/29 |
| 2,751,743 A * | 6/1956 | Bauer | A01D 45/025 | 460/29 |
| 2,768,626 A * | 10/1956 | Pelowski | A01D 45/025 | 460/33 |
| 2,842,929 A * | 7/1958 | Schultz | A01D 45/025 | 460/34 |
| 3,100,491 A * | 8/1963 | Dillon | A01D 45/025 | 492/43 |
| 3,174,484 A * | 3/1965 | Anderson | A01D 45/025 | 56/104 |
| 3,707,833 A * | 1/1973 | Sutton | A01D 45/025 | 460/135 |
| 3,858,384 A * | 1/1975 | Maiste | A01D 45/025 | 56/104 |
| 3,982,385 A * | 9/1976 | Hyman | A01D 45/025 | 56/106 |
| 4,220,277 A * | 9/1980 | Hesse | B21K 1/063 | 72/713 |
| 4,233,804 A * | 11/1980 | Fischer | A01D 45/025 | 56/104 |
| 4,616,500 A * | 10/1986 | Alexoff | B21C 37/16 | 72/283 |
| 5,205,464 A * | 4/1993 | Simon | B23K 20/129 | 228/114 |
| 5,213,250 A * | 5/1993 | Simon | B21K 1/066 | 228/114 |
| 5,216,912 A * | 6/1993 | Tanaka | B21K 1/063 | 72/713 |
| 5,282,352 A * | 2/1994 | Schoolman | A01D 45/025 | 56/62 |
| 5,333,775 A * | 8/1994 | Bruggemann | B21D 35/006 | 228/155 |
| 5,337,476 A * | 8/1994 | Orsini, Jr. | B21K 1/12 | 29/523 |
| 6,038,771 A * | 3/2000 | Takehara | F16C 7/08 | 72/370.03 |
| 6,050,071 A * | 4/2000 | Bich | A01D 45/025 | 56/104 |
| 6,112,567 A * | 9/2000 | Birkert | B21D 26/033 | 72/58 |
| 6,216,428 B1 * | 4/2001 | Becker | A01D 45/025 | 56/104 |
| 6,925,714 B2 * | 8/2005 | Toth | B21K 1/063 | 74/552 |
| 6,959,479 B2 * | 11/2005 | Yamanaka | B21D 39/00 | 29/515 |
| 7,275,407 B2 * | 10/2007 | Ginsberg | B21K 1/12 | 72/370.03 |
| 7,412,866 B2 * | 8/2008 | Jahani | B60B 35/16 | 72/370.14 |
| 7,752,829 B1 * | 7/2010 | Rottinghaus | A01D 45/021 | 56/110 |
| 7,779,945 B2 * | 8/2010 | Allgauer | B62D 1/16 | 29/516 |
| 8,037,667 B2 * | 10/2011 | Eagles | A01D 45/025 | 56/103 |
| 8,141,404 B2 * | 3/2012 | Newport | B21D 53/88 | 72/370.14 |
| 8,720,171 B2 * | 5/2014 | Lohrentz | A01D 45/025 | 56/109 |
| 8,955,297 B2 * | 2/2015 | Capello | A01D 45/025 | 56/104 |
| 9,210,842 B2 * | 12/2015 | Lohrentz | A01D 45/025 | |
| 9,409,226 B2 * | 8/2016 | Koppensteiner | B21J 7/14 | |
| 9,560,804 B1 * | 2/2017 | Calmer | A01D 45/025 | |
| 9,668,414 B2 * | 6/2017 | Calmer | A01D 45/025 | |
| 10,039,232 B2 * | 8/2018 | Calmer | A01D 45/025 | |
| 10,314,233 B2 * | 6/2019 | Wenger | A01D 57/22 | |
| 10,321,626 B2 * | 6/2019 | Fredricks | A01D 34/44 | |
| 2003/0019269 A1 * | 1/2003 | Rolf | B21H 1/00 | 72/85 |
| 2004/0060385 A1 * | 4/2004 | Prucher | B21K 1/26 | 74/607 |
| 2005/0003897 A1 * | 1/2005 | Wagner | B21D 26/14 | 464/136 |
| 2007/0186604 A1 * | 8/2007 | Koppensteiner | B21J 5/10 | 72/97 |
| 2010/0178964 A1 * | 7/2010 | Anderson | A01D 82/02 | 460/32 |
| 2010/0251794 A1 * | 10/2010 | Wiedenmaier | B21J 13/00 | 72/264 |
| 2014/0182255 A1 * | 7/2014 | Calmer | A01D 45/025 | 56/104 |
| 2016/0338268 A1 * | 11/2016 | Calmer | A01D 45/025 | |
| 2018/0054970 A1 * | 3/2018 | Calmer | A01D 45/025 | |
| 2018/0199510 A1 * | 7/2018 | Ehle | A01D 57/22 | |
| 2019/0174675 A1 * | 6/2019 | Gramm | A01D 45/025 | |
| 2021/0007279 A1 * | 1/2021 | Calmer | A01D 45/021 | |
| 2021/0212256 A1 * | 7/2021 | Calmer | A01D 45/021 | |

FOREIGN PATENT DOCUMENTS

| | | | | |
|---|---|---|---|---|
| CA | 3077894 A1 * | 10/2020 | | A01D 45/00 |
| CN | 106358587 A * | 2/2017 | | A01D 45/025 |
| CN | 106416606 A * | 2/2017 | | A01D 45/025 |
| CN | 106961920 A * | 7/2017 | | A01D 45/02 |
| CN | 105208849 B * | 2/2018 | | A01D 45/025 |
| CN | 108174684 A * | 6/2018 | | A01D 45/025 |
| CN | 112602457 A * | 4/2021 | | |
| CN | 112616434 A * | 4/2021 | | |
| CN | 113170656 A * | 7/2021 | | |
| CN | 113228931 A * | 8/2021 | | |
| CN | 114080896 A * | 2/2022 | | |
| CN | 114080906 A * | 2/2022 | | |
| CN | 114532058 A * | 5/2022 | | |
| CN | 114568123 A * | 6/2022 | | |
| CN | 115013485 A * | 9/2022 | | |
| CN | 115176586 A * | 10/2022 | | |
| CN | 115176587 A * | 10/2022 | | |
| CN | 115176597 A * | 10/2022 | | |
| CN | 115250732 A * | 11/2022 | | |
| DE | 19811156 A1 * | 9/1999 | | A01D 45/025 |
| DE | 102005054998 A1 * | 5/2007 | | A01D 45/025 |
| DE | 102012014085 A1 * | 1/2014 | | A01D 41/12 |
| DE | 102020110526 A1 * | 10/2020 | | |
| EP | 1040746 A1 * | 10/2000 | | A01D 45/025 |
| EP | 1305997 A1 * | 5/2003 | | A01D 45/025 |
| EP | 1417877 A1 * | 5/2004 | | A01D 45/025 |
| EP | 3123854 | 2/2017 | | |
| EP | 3123854 A1 * | 2/2017 | | A01D 41/14 |
| EP | 3287001 A1 * | 2/2018 | | A01D 34/44 |
| EP | 3516943 | 7/2019 | | |
| EP | 3516943 A1 * | 7/2019 | | A01D 34/44 |
| FR | 3043525 | 5/2017 | | |
| FR | 3043525 A1 * | 5/2017 | | |
| WO | 0108465 | 2/2001 | | |
| WO | 2012023083 | 2/2012 | | |
| WO | WO-2012023083 A1 * | 2/2012 | | A01D 45/025 |
| WO | 2012152866 | 11/2012 | | |
| WO | WO-2012152866 A1 * | 11/2012 | | A01D 45/025 |
| WO | 2016118659 | 7/2016 | | |
| WO | WO-2016118659 A1 * | 7/2016 | | A01D 34/44 |
| WO | WO-2019092275 A1 * | 5/2019 | | |

* cited by examiner

STALK ROLLER ASSEMBLY FOR AN AGRICULTURAL SYSTEM

CROSS-REFERENCE TO RELATED APPLICATION

The present application is a divisional of U.S. application Ser. No. 15/883,609, entitled "STALK ROLLER ASSEMBLY FOR AN AGRICULTURAL SYSTEM," and filed Jan. 30, 2018, the entirety of which is incorporated by reference herein for all purposes.

BACKGROUND

The present disclosure relates generally to a stalk roller assembly for an agricultural system.

A harvester may be used to harvest agricultural crops, such as barley, beans, beets, carrots, corn, cotton, flax, oats, potatoes, rye, soybeans, wheat, or other plant crops. Moreover, a combine (e.g., combine harvester) is a type of harvester generally used to harvest certain crops that include grain (e.g., barley, corn, flax, oats, rye, wheat, etc.). During operation of a combine, the harvesting process may begin by removing a plant from a field, usually using a stalk roll assembly configured to cut the plant. The combine may then separate the plant into different agricultural materials, such as grain and material other than grain (MOG).

Generally, the stalk roller assembly used to remove the plant from the field and cut the plant includes stalk rollers that are machined and/or formed from welded components. Accordingly, manufacturing the stalk rollers of the stalk roller assembly may be time and/or labor intensive operations. Furthermore, certain stalk rollers may include a solid shaft, which increases the weight of the stalk roller assembly. As a result, combines that include such stalk roller assemblies may be biased toward the header, thereby placing additional weight on the front tires of the combine, leading to excessive ground pressure and/or soil.

BRIEF DESCRIPTION

In one embodiment, stalk roller assembly for an agricultural system includes a stalk roller having a hollow shaft. The hollow shaft has a first end having a first shape, such that the first end engages a guide element. Furthermore, the hollow shaft has a second end having a second shape that engages a drive shaft, such that the first shape is different than the second shape. In addition, the hollow shaft is formed from a single piece of material.

In another embodiment, a method for manufacturing a stalk roller is provided. The method includes, forming a hollow shaft from a single piece of material, such that the hollow shaft has a first end and a second end. The first end engages a guide element, and the second end engages a drive shaft. Furthermore, the method includes reshaping the first end of the hollow shaft to a first shape to facilitate engagement with the guide element, reshaping the second end of the hollow shaft to a second shape to facilitate engagement with the drive shaft, or any combination thereof.

In yet another embodiment, a hollow shaft for in a stalk roller of an agricultural system includes a first, second, and third portion. The first portion has a first end of the hollow shaft, such that the first portion engages a guide element. The second portion couples to a variety of blades. The third portion has a second end, such that the third portion engages a drive shaft. The hollow shaft is formed from a single piece of material.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
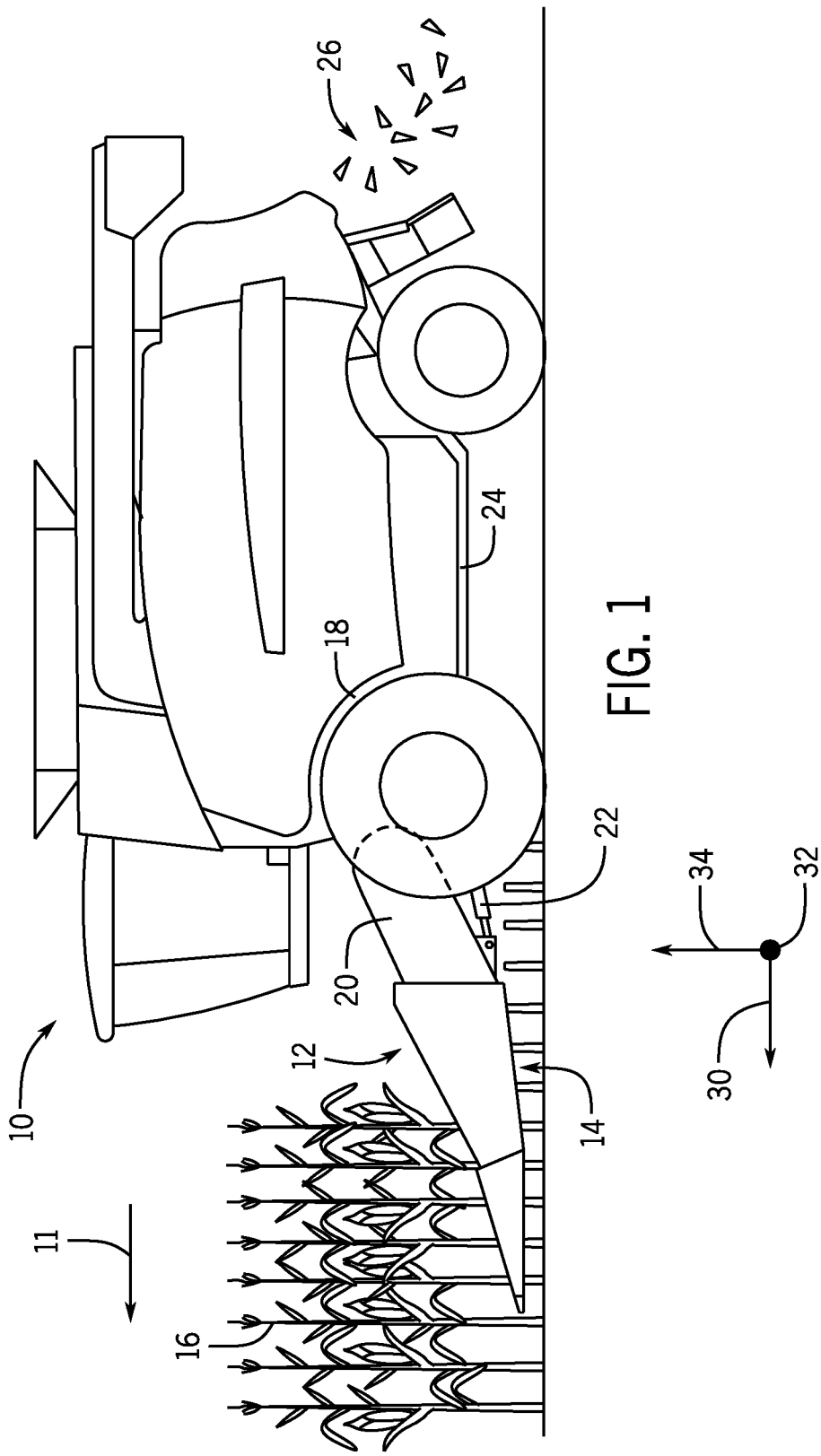
FIG. 1 is a perspective view of an embodiment of a harvester that includes stalk roller assemblies.

Turning now to the drawings, FIG. 1 is a perspective view of an embodiment of a harvester 10 (e.g., combine) that includes stalk roller assemblies. The harvester 10 may be configured to harvest grains such as barley, flax, oats, rye, wheat, and so forth. Accordingly, in some embodiments, the harvester 10 is configured to remove plants from a field while the harvester travels along a direction of travel 11, and to separate the plants into grain and material other than grain (MOG).

The harvesting process begins with the harvester 10 using a front attachment 12 (e.g., headers), which includes multiple stalk roller assemblies 14, to remove plants 16 from the field. An operator of the harvester 10 may be seated in a cab 14, and the operator may monitor the operation of the stalk roller assemblies 14 and other systems of the harvester 10. In some embodiments, each stalk roller assembly 14 of the front attachment 12 includes a pair of stalk rollers, as described below with regard to FIG. 2. As illustrated, the front attachment 12 is coupled to the front of a body 18 of the harvester 10, via one or more arms 20. Furthermore, the harvester 10 may include one or more hydraulic cylinders 22 configured to drive motion of the front attachment 12 to the height of the front attachment relative to the surface of the field.

After removing the plants from the field, the harvester 10 transports the plants to a rotor that is, for example, supported on a chassis 24 of the harvester 10 and housed within the body 18. In some embodiments, the rotor may rotate to separate the grain of the plants from the MOG (e.g., agricultural material such as straw, soil, etc.). For example, the rotor may have multiple projections on its surface that interact with the plants to facilitate separation of the grain from the MOG. The grain may be directed from the rotor toward a cleaning system configured to further separate the grain from the MOG using a blower. In some embodiments, the MOG is directed toward a distribution chamber, which provides the MOG to a spreader system 26 for distribution to the field.

To facilitate discussion, a coordinate system is utilized. The coordinate system includes a longitudinal axis 30, a lateral axis 32, and a vertical axis 34. Each of the longitudinal axis 30, the lateral axis 32, and the vertical axis 34 are oriented orthogonal (e.g., perpendicular) to one another. Furthermore, the direction of travel 11 of the harvester 10 may be oriented substantially parallel to the longitudinal axis 30.

Figure 2:
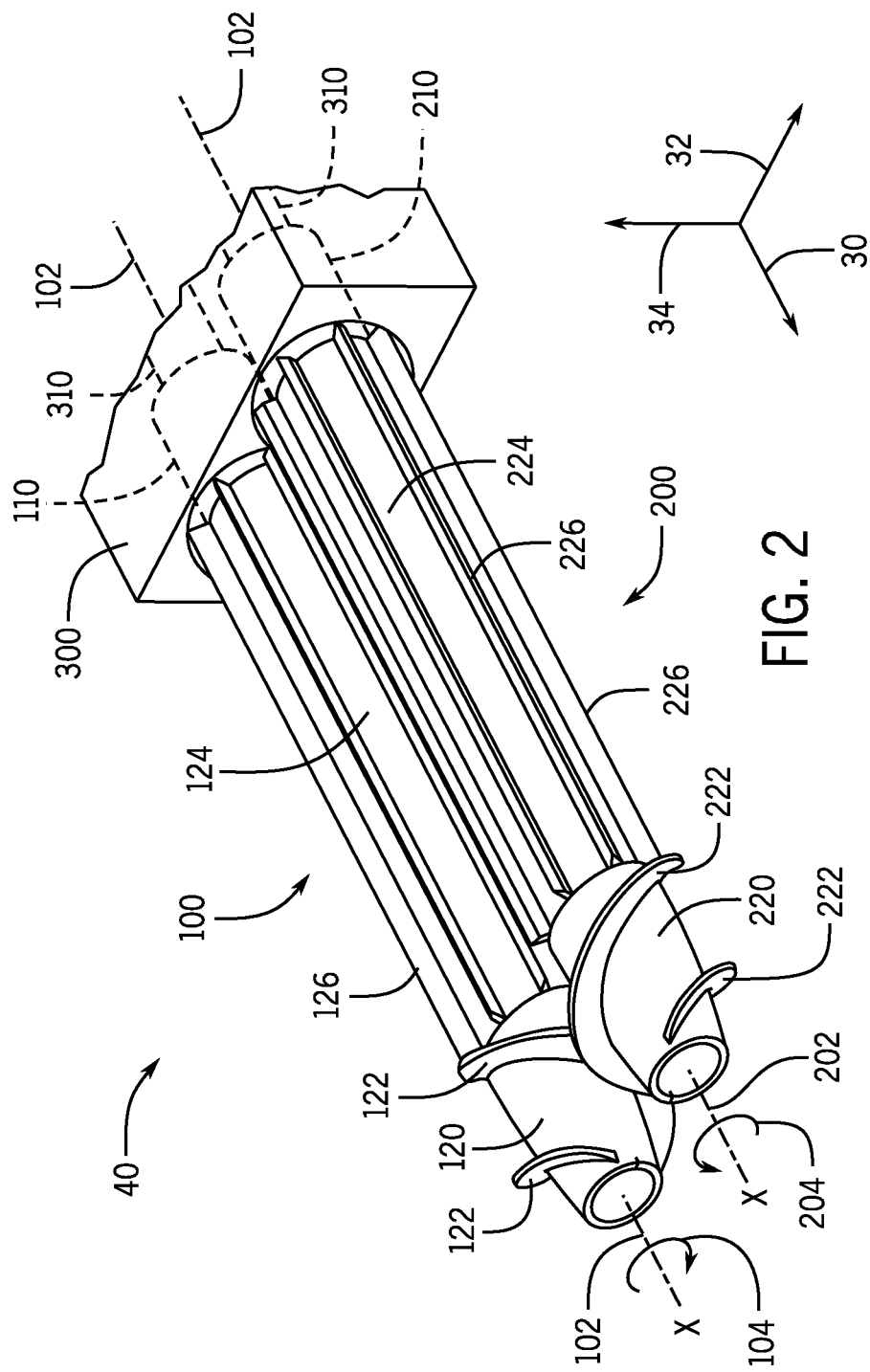
FIG. 2 is a perspective view of an embodiment of a stalk roller assembly that may be used in the harvester of FIG. 1, in which the stalk roller assembly includes a pair of stalk rollers.

FIG. 2 is a perspective view of an embodiment of a stalk roller assembly 14 that may be used in the harvester 10 of FIG. 1, in which the stalk roller assembly 14 includes a pair of stalk rollers. As described in detail below, each stalk roller may have a hollow shaft, which is formed from a single piece of material. Accordingly, the stalk rollers described herein may be lighter (e.g., less heavy) and may employ less labor-intensive manufacturing techniques than conventional stalk rollers. In some embodiments, stalk roller assembly 14 may be included in the front attachment of the harvester 10. In some embodiments, the stalk roller assembly 14 may include one, two, three, four, or any other suitable number of stalk rollers. In addition, the front attachment may include any suitable number of stalk roller assemblies, such as one, two, four, six, eight, ten, or twelve stalk roller assemblies. In the illustrated embodiment, a first stalk roller 100 and a second stalk roller 200 of the stalk roller assembly 14 are oriented substantially parallel to one another. As illustrated, the first stalk roller 100 is oriented along a first rotational axis 102, and the second stalk roller 200 is oriented along a second rotational axis 202, such that the first rotational axis 102 and the second rotational axis 202 are both oriented substantially parallel to the longitudinal axis 30.

Furthermore, the first stalk roller 100 is configured to rotate in a first direction 104 about the first rotational axis 102, and the second stalk roller 200 is configured to rotate in a second direction 204 opposite the first direction, about the second rotational axis 202. The first stalk roller 100 and the second stalk roller 200 may be driven to rotate in opposite directions by a drive assembly 300. In the illustrated embodiment, the first stalk roller 100 includes a coupling shaft 110 configured to couple to a drive shaft 310 of the drive assembly 300, and the second stalk roller 200 includes a coupling shaft 210 configured to couple to a drive shaft 310 of the drive assembly 300. The coupling of the coupling shafts to the drive shafts 310 may be facilitated by a universal joint, a jaw coupling, a rag joint, a splined joint, a prismatic joint, and the like. In other embodiments, the movement (e.g., rotation) of the stalk rollers 100, 200 may be driven directly by respective motors. In further embodiments, the motion of each stalk roller of the stalk roller assembly 14 may be configured to be driven by a single motor via any suitable arrangement. Furthermore, the drive shaft 310 of the first and second stalk rollers 100, 200 may mate with a motor (e.g., one or more electric or hydraulic motors), such that the drive shaft 310 is connected to the motor(s), which drive the drive shafts 310 in rotation.

Each stalk roller 100, 200 includes a respective guide element (e.g., spiral nose) 120, 220. In the illustrated embodiment, the guide elements 120, 220 each include a corresponding helical guide 122, 222. Each helical guide 122, 222 extends outwardly from a body of the corresponding guide elements 120, 220. While the illustrated embodiment includes a specific number of helical guides on each guide element 120, 220, in further embodiments, the guide elements may each include one, three, four, five, or any suitable number of helical guides. The guide elements 120, 220 and the corresponding helical guides are configured to guide plant stalks to blades of the stalk rollers 100, 200.

In the illustrated embodiment, each stalk roller 100, 200 includes many corresponding rows 124, 224 of blades 126, 226. Each row 124, 224 includes multiple corresponding blades 126, 226 extending substantially along the rotational axis 102, 202, of the respective stalk roller 100, 200. In the illustrated embodiment, the rows 124, 224 of respective blades 126, 226 extend from a hollow shaft of a corresponding stalk roller 100, 200, such that the blades 126, 226 extend along the length of the hollow shaft (e.g., from the guide element to the coupling shaft). Furthermore, the rows 124 of blades 126 of the first stalk roller 100 may be oriented substantially parallel to one another. Similarly, the rows 224 of blades 226 of the second stalk roller 200 may be oriented substantially parallel to one another. In some embodiments, the rows 124, 224 of corresponding blades 126, 226 may be removably coupled to (e.g., the hollow shafts of) the corresponding stalk rollers 100, 200. For example, the blades 126, 226 may be removably coupled to the corresponding hollow shafts via openings in the hollow shafts (e.g., the openings in the corresponding hollow shafts may receive corresponding pins of the blades). The blades may be connected to a bar and the bar may be connected to the hollow shaft as one bar per row. Furthermore, in some embodiments, the blades 126 of the first stalk roller 100 are configured to mesh with the blades 226 of the second stalk roller 200 while the stalk rollers 100, 200 are in operation (e.g., driven in rotation). The rotation of the stalk rollers 100, 200 may cut the stalks of plants as the plants come into contact with the rotating blades 126, 226.

Figure 3:
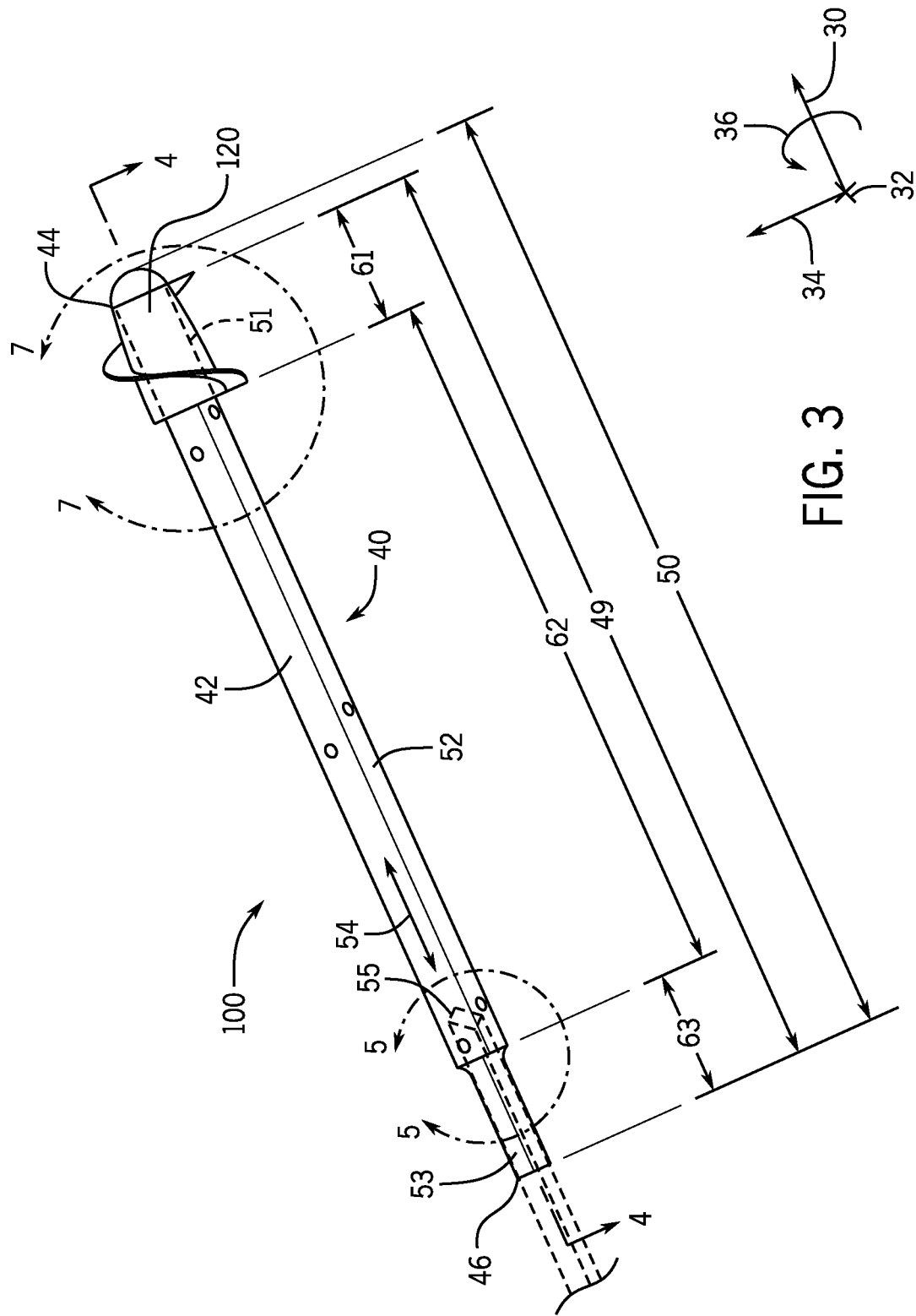
FIG. 3 is a perspective view of an embodiment of a hollow shaft and a guide element that may be used in the stalk roller of FIG. 2.

FIG. 3 is a perspective views of an embodiment of a hollow shaft 40 and a guide element 120 that may be used in the stalk roller 100 of FIG. 2. In some embodiments, the second stalk roller 200 is manufactured the same and includes the same components as the first stalk roller 100. In the illustrated embodiment, the stalker roller 100 is oriented along the longitudinal axis 30 and is configured to rotate about rotational axis 102 in a circumferential direction 36. In certain embodiments, the hollow shaft 40 and the guide element 120 may be formed from a steel alloy (e.g., carbon steel, maraging steel), or any other suitable material. In the illustrated embodiment, the hollow shaft 40 includes a body 42 that has a quadrilateral cross-sectional shape. However, in further embodiments, the hollow shaft may include a body that has a circular cross-sectional shape, hexagonal cross-sectional shape, square cross-sectional shape, triangular cross-sectional shape, pentagonal cross-sectional shape, or any other suitable cross-sectional shape. Furthermore, in the illustrated embodiment, the stalk roller 100 has a stalk roller length 50. The stalk roller length 50 enables the stalk roller 100 to fit into the front attachment of the harvester (e.g., combine). In the illustrated embodiment, the hollow shaft 40 has a total length 49. In addition, the hollow shaft 40 includes a first portion 51 that has a first length 61, a second portion 52 (e.g. corresponding to the body 42) that has a second length 62, and a third portion 53 that has a third length 63. As described in detail below, in some embodiments, the first portion 51 is configured to couple to the guide element 120, and the third portion 53 is configured to couple to a drive shaft.

In the illustrated embodiment, the guide element 120 is coupled to the hollow shaft 40 via an interference fit (e.g., a press fit or a friction fit) at a first end 44, whereby the first portion 51 of the hollow shaft 40 is positioned inside an opening in the guide element 120. In the illustrated embodiment, the first portion 51 of the hollow shaft 40 is configured to slide into the guide element 120 a distance substantially equal to the first length 61. The opening of the guide element 120 may include inner dimensions that are substantially equal to the outer dimensions of the first portion 51 of the hollow shaft 40, such that the guide element 120 may receive the hollow shaft 40 to establish an interference fit. In some embodiments, the tolerance of the outer dimensions of the first portion 51 and the inner dimensions of the guide element opening are controlled. For example, the tightness of the fit between the guide element 120 and the first portion 51 of hollow shaft 40 may be controlled by selecting an amount of interference (e.g., the planned difference between the nominal inner dimensions of the guide element 120 and the nominal outer dimensions of the hollow shaft 40). In the illustrated embodiment, the cross-sectional shape of the first portion 51 of the hollow shaft 40 is quadrilateral and the cross-sectional shape of the opening of the guide element 120, which is configured to receive and create an interference fit with the first portion 51 of the hollow shaft 40, is also quadrilateral. However, in further embodiments, the respective cross-sectional shapes may be any other suitable shapes (e.g., triangular, hexagonal, etc.).

The third portion 53 of the hollow shaft 40 is formed (e.g., reshaped) to any suitable shape configured to couple to a drive shaft at the second end 46. For example, in the illustrated embodiment, the third portion 53 is shaped (e.g., forged, etc.) to a hexagonal shape that has a smaller cross-sectional area than that of the first portion 51 and the second portion 52 of the hollow shaft 40. However, in alternative embodiments, the third portion 53 may be shaped to form any other suitable cross-sectional shape (e.g., square, triangular, circular, octagonal, etc.) and/or to have a larger or equal cross-sectional area as that of the first portion 51 and/or the second portion 52. In some embodiments, if the third portion 53 has a similar cross-sectional shape and cross-sectional area to that of the second portion 52, the third portion 53 may not be modified using the techniques described below. Furthermore, the drive shaft may be driven by a driving mechanism (e.g., motor) to drive the hollow shaft 40 in rotation (e.g., while in operation). Accordingly, the shape of the third portion 53 is selected to correspond to the shape of the drive shaft, which is configured to couple to the third portion 53 at the second end 46. For example, if the drive shaft has an opening configured to fit over the third portion 53 of the hollow shaft 40, the third portion 53 may be shaped to fit into the opening of the drive shaft (e.g., to establish an interference fit between the third portion 53 and the drive shaft 310).

In some embodiments, the shape of the third portion 53 of the hollow shaft 40 may be formed via a forging process. For example, the hollow shaft 40 may start as hollow tubing (e.g., a hollow square tube) with a length 49, as illustrated. The hollow shaft 40 may then undergo a forging process, whereby heat may be applied to the third portion 53. In alternative embodiments, the hollow shaft 40 may undergo a cold forging process, whereby heat is removed from the third portion 53. In some embodiments, shaping the third portion 53 includes inserting 54 a mandrel 55 into the hollow shaft 40 at the second end 46, and then applying a radially force around the third portion to reshape of the third portion 53. Accordingly, the transition from the larger square cross-sectional shape to the smaller hexagonal shape of the third portion 53 may be achieved via the forging process described above. However, in alternative embodiments, the change in shape between the original hollow shaft shape and the third portion 53 may be achieved via a cold forming operation, hydroforming, or any other suitable manufacturing process. For example, the third portion 53 may be hydroformed by starting with the smaller hexagonal shape and hydroforming the square portion of the hollow shaft 40. In addition or alternatively, the hexagonal shape of the third portion 53 may be larger than the cross-sectional area of the hollow shaft 40, whereby the square cross-sectional area of the hollow shaft 40 is forged and the hexagonal shape of the third portion 53 is hydroformed. In some embodiments, the hollow shaft 40 may be free of welds, which may decrease labor costs, decrease the time to manufacture the hollow shaft 40, decrease the weight of the stalk rollers, and/or decrease the stress experienced by the stalk rollers due to their high weight.

Figure 4:
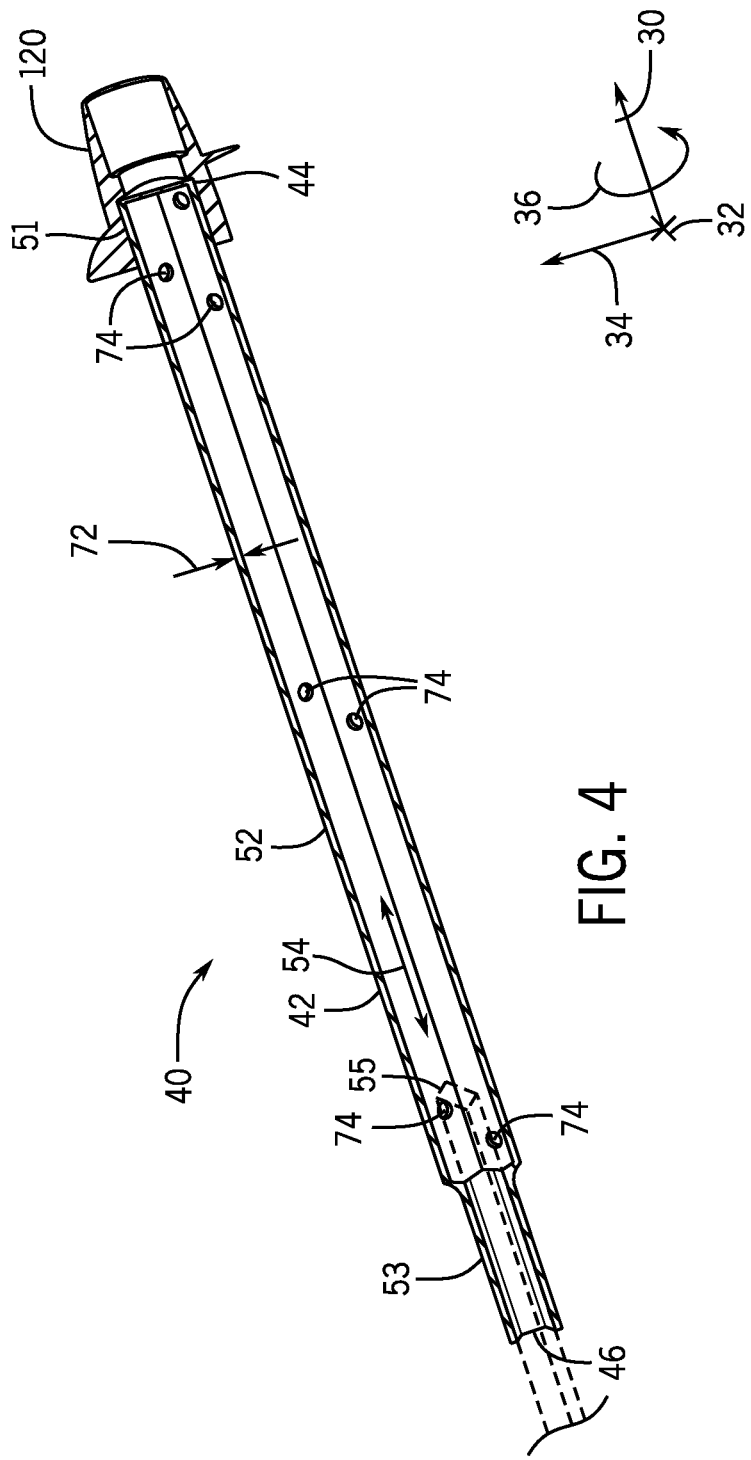
FIG. 4 is a cross-section view of the hollow shaft and the guide element of FIG. 3.

FIG. 4 is a cross-section view of the hollow shaft 40 and the guide element 120 of FIG. 3, taken along line 4 of FIG. 3. As mentioned above, in the illustrated embodiment, the first section 51 couples to the guide element 120 at the first end 44 via an interference fit, and the third section 53 is configured to couple to a drive shaft at the second end 46. In the illustrated embodiment, the body of the hollow shaft 40 has a wall thickness 72 sufficient to enable the hollow shaft to support the blades and the guide element 120. In the illustrated embodiment, the body of the hollow shaft 40 has a quadrilateral cross-sectional shape, and the thicknesses 72 of the four sides that form the quadrilateral cross-section may be substantially equal to one another. However, in further embodiments, the sides that form the body of the hollow shaft may have different thicknesses.

In the illustrated embodiment, the second portion 52 includes openings 74 configured to receive coupling members (e.g., pins). In the illustrated embodiment, a first side of the body 42 of the hollow shaft 40 includes three openings 74 equally spaced apart from one another along the longitudinal axis 30, and the second side includes four openings 74 along the longitudinal axis 30. However, in further embodiments, the sides of the body of the hollow shaft may include any suitable number of openings having any suitable spacing. The openings 74 may extend through the body 42 (e.g., the length of the thickness 72).

With regard to the techniques used in forming the openings 74 in the body 42 (e.g., in the second portion 52) of the hollow shaft 40, in some embodiments, the openings 74 are flow drilled. In further embodiments, the openings 74 may be formed by friction drilling, spot drilling, center drilling, thermal drilling, form drilling, friction stir drilling, or any other suitable process.

Furthermore, the third portion 53 may be configured to fit into the drive shaft after being formed (e.g., via the forging process discussed above). While in the illustrated embodiment, the third portion 53 is hollow, in alternative embodiments, the third portion 53 may be solid after being formed. In some embodiments, the third portion 53 is hollow, thereby forming an opening. In such embodiments, the drive shaft fits into the opening of the third portion 53, such that the third portion 53 receives the drive shaft. Furthermore, in the illustrated embodiment, the hollow shaft 40 does not included any welds, and the hollow shaft 40 is not machined to achieve the shape of the hollow shaft 40. Accordingly, manufacturing the hollow shaft as described herein may be less labor intensive to form than a hollow shaft formed by welding and/or machining.

Figure 5:
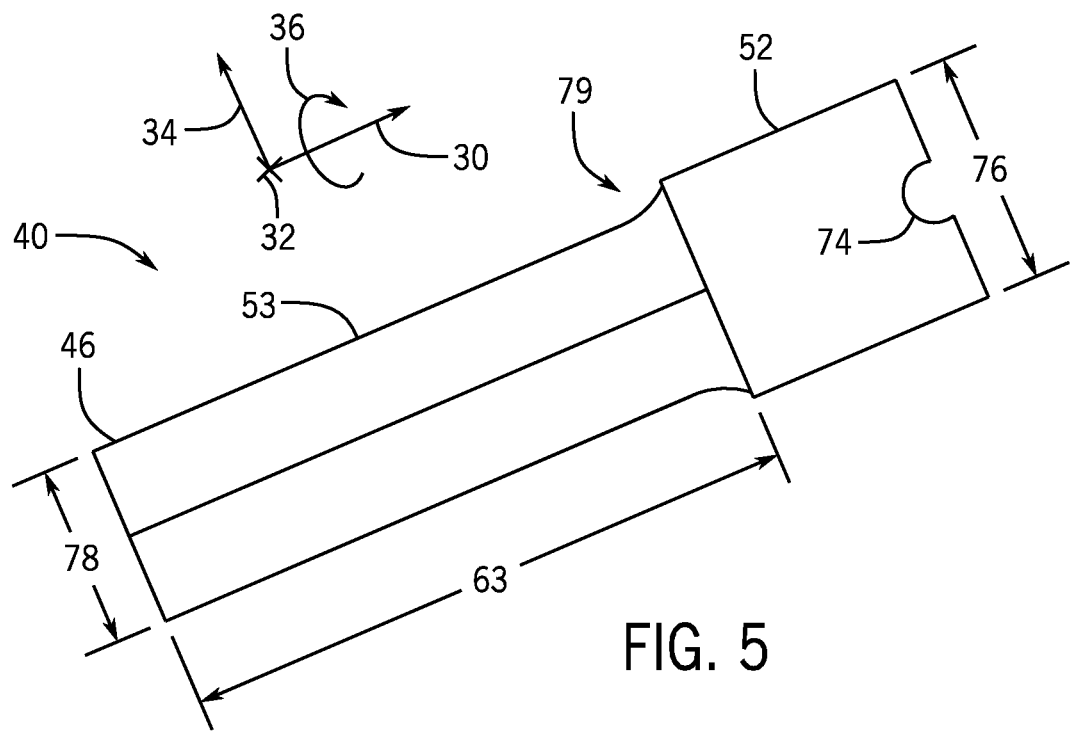
FIG. 5 is a side view of a portion of the hollow shaft of FIG. 3.

FIG. 5 is a side view of a portion of the hollow shaft 40 of FIG. 3. In the illustrated embodiment, the second section 52 has a larger width 76 than the width 78 of the third section 53. However, in further embodiments, the width 78 of the third section 53 may be equal to or greater than the width 76 of the second section 52. Furthermore, as mentioned above, the third section 53 may be formed by a forging process. In some embodiments, forming the shape of the third portion 53 includes inserting 54 a mandrel 55 into the hollow shaft 40 at the second end 46, and then applying a radially inward force around the third portion to reshape of the third portion 53. In the illustrated embodiment, the junction 79 between the second portion 52 and the third portion 53 is smoothly chamfered (e.g., via the forging process), but in alternative embodiments, the junction may include a right angle (e.g., about 90°), an angled junction of about 45°, a beveled junction, and the like. The transition from the larger square shape of the second portion 52 to the smaller hexagonal shape of the third portion may be achieved via the forging process described above.

In alternative embodiments, reshaping hollow shaft 40 may be achieved via a cold forming operation, hydroforming, or any other suitable manufacturing process. In some embodiments, during manufacturing of the hollow shaft 40, the hollow shaft 40 may begin as a metal tube with a cross section corresponding to the third portion 53 (e.g., at the second end 46). The second portion 52 (e.g., and the first portion 51) may then be hydroformed into the target shape (e.g., the shape shown in FIGS. 3-5). As mentioned above, the third portion 53 may have any suitable cross-sectional shape (e.g., hexagonal, square, circular, etc.) and size, and the second portion 52 may have any suitable cross-sectional shape (e.g., square, hexagonal, circular, etc.) and size.

Figure 6:
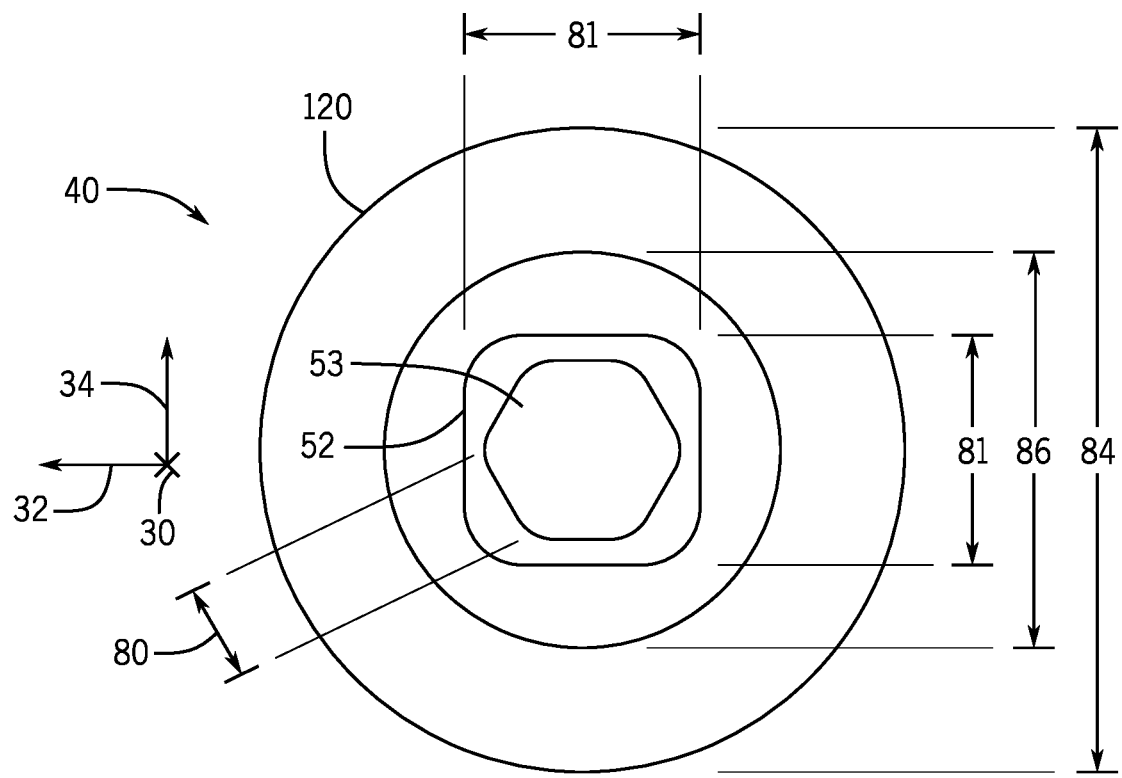
FIG. 6 is a rear view of the hollow guide element of FIG. 3.

FIG. 6 is a rear view of the hollow shaft 40 and the guide element 120 of FIG. 3. As illustrated, the hollow shaft 40 is oriented substantially along the longitudinal axis 30. In the illustrated embodiment, the third portion 53 (e.g., at the second end 46) has a hexagonal cross-sectional shape. Accordingly, the third portion 53 has a cross section with six equal sides, each having a length 80. In the illustrated embodiment, the third portion 53 is hollow and made of a metallic (e.g., steel alloy) material. In further embodiments, the third portion 53 may be of a solid metallic material (e.g., steel alloy). Furthermore, in the illustrated embodiment, the second portion 52 (e.g., the body 42) of the hollow shaft 40 has a substantially square cross-sectional shape, and each side of the second portion 52 has a length 81 (e.g., which may be equal to the cross-section shape side width 76 of FIG. 5). However, in further embodiments, at least two sides may have different lengths, and/or the second portion may have a cross-sectional shape other than a square or a quadrilateral.

In addition, the guide element 120 has a circular cross-sectional shape with a first diameter 84. In the illustrated embodiment, the guide element 120 has a larger cross-sectional area than the second portion 52 and the third portion 53 of the hollow shaft 40. In the illustrated embodiment, the guide element 120 tapers from the first diameter 84 down to a second diameter 86 along the longitudinal axis 30, such that the first diameter 84 is larger than the second diameter 86. In addition to the body of the guide element 120 being tapered, the helical guides spiral around the body of the guide element 120. Furthermore, the guide element 120 includes an opening configured to receive the first portion 51 of the hollow shaft 40 at the first end 44. As mentioned above, the dimensions of the inner surface of the guide element 120 and the outer surface of the first portion 51 of the hollow shaft 40 may be selected, such that an interference fit is created between the inner surface of the guide element 120 and the outer surface of the first portion 51 of the hollow shaft 40.

Figure 7:
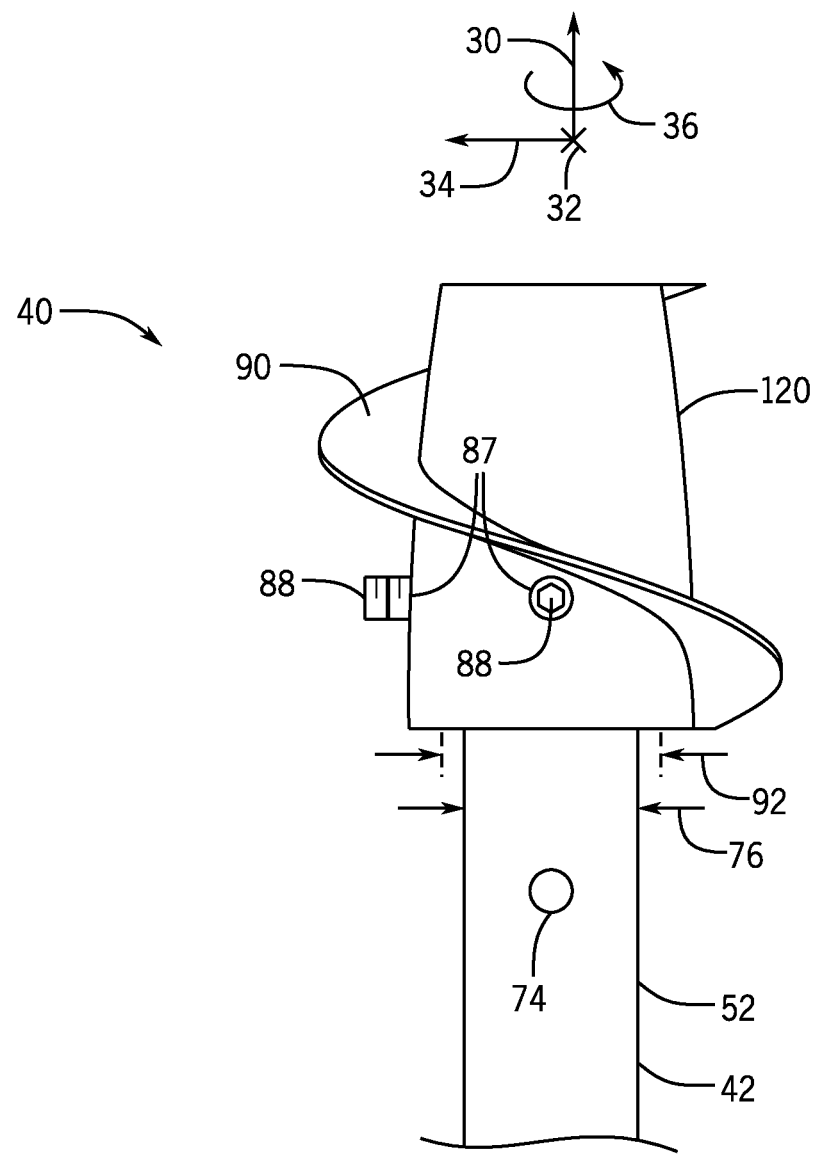
FIG. 7 is a side view of a portion of the hollow guide element of FIG. 3.

FIG. 7 is a side view of a portion of the hollow shaft 40 and the guide element 120 of FIG. 3. In the illustrated embodiment, the first portion 51 of the hollow shaft 40 is engaged with the guide element 120 (e.g., the first portion 51 of the hollow shaft 40 is coupled in the guide element 120 by an interference fit). Furthermore, in the illustrated embodiment, the guide element 120 has radial openings 87 extending through the thickness of the guide element 120. The radial openings 87 are configured to receive corresponding pins 88 (e.g., set screws, grove pins, etc.). The corresponding pins 88 are configured to engage (e.g., the first portion 51 of) the hollow shaft 40 to block movement of the guide element 120 relative to the hollow shaft 40. Furthermore, in alternative embodiments, the radial openings 87 and the corresponding pins 88 may be omitted.

As mentioned above, the first section 51 and the second section 52 of the hollow shaft 40 have widths 76 that are smaller than the corresponding width of the interior of the guide element 120, such that the first section 51 of the hollow shaft 40 fits into the guide element 120. For example, the guide element 120 may have a first diameter 84 of about 64 millimeters (mm) and interior widths 92 of about 44 mm. Accordingly, the side widths 76 may be smaller than 44 mm (e.g., about 45 mm), such that the first portion 51 of the hollow shaft 40 fits into interior of the guide element 120. Furthermore, the guide element 120 may include any suitable number of helical guides 90 to facilitate guiding plant stalks to blades coupled to the body of the hollow shaft 40. In further embodiments, the guide element 120 may have a shaft that slides into the first portion 51 of the hollow shaft 40.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A stalk roller assembly for an agricultural system, the stock roller assembly comprising:
a stalk roller having a hollow shaft, wherein the hollow shaft has a first end having a first outer cross-sectional shape and configured to engage a guide element and a second end having a second outer cross-sectional shape and configured to engage a drive shaft, wherein the first outer cross-sectional shape is different than the second outer cross-sectional shape, a cross-sectional area of the first end is the same as a cross-sectional area of a body of the hollow shaft, the second end is configured to be disposed within the drive shaft, and the hollow shaft is formed from a single piece of material.

2. The stalk roller assembly of claim 1, wherein the drive shaft is configured to be driven by a motor.

3. The stalk roller assembly of claim 1, wherein the first outer cross-sectional shape is substantially square, the second outer cross-sectional shape is hexagonal, or a combination thereof.

4. The stalk roller assembly of claim 1, wherein the stalk roller assembly comprises a first plurality of blades coupled to an outer surface of the hollow shaft.

5. The stalk roller assembly of claim 4, comprising a second stalk roller having a second hollow shaft and a second plurality of blades coupled to an outer surface of the second hollow shaft of the second stalk roller, wherein the first plurality of blades are configured to mesh with the second plurality of blades while the stalk roller and the second stalk roller are in operation, and the stalk roller and the second stalk roller are configured to be rotatably driven in opposite directions about respective center axes.

6. The stalk roller assembly of claim 1, wherein the first outer cross-sectional shape is larger than the second outer cross-sectional shape.

7. The stalk roller assembly of claim 1, wherein the hollow shaft comprises a plurality of openings configured to facilitate coupling the hollow shaft to a plurality of blades, wherein the plurality of blades is configured to be positioned along an outer surface of the hollow shaft.

8. The stalk roller assembly of claim 1, comprising the guide element, wherein the first end is disposed within an opening in the guide element.

9. A hollow shaft for a stalk roller of an agricultural system, wherein the hollow shaft is formed from a single piece of material, and wherein the hollow shaft comprises:
 a first portion having a first end of the hollow shaft, wherein the first portion is configured to engage a guide element;
 a second portion configured to couple to a plurality of blades; and
 a third portion having a second end of the hollow shaft, wherein the third portion is configured to engage a drive shaft;
 wherein a cross-sectional area of the first end is the same as a cross-sectional area of a body of the hollow shaft, and the second end is configured to be disposed within the drive shaft.

10. The hollow shaft of claim 9, wherein the first portion is configured to be disposed within an opening of the guide element.

11. The hollow shaft of claim 9, comprising a plurality of openings configured to facilitate coupling the hollow shaft to a plurality of blades, wherein the plurality of blades is configured to be positioned along an outer surface of the hollow shaft.

12. A stalk roller assembly for an agricultural system, the stock roller assembly comprising:
 a stalk roller having a hollow shaft, wherein the hollow shaft has a first end and a second end, the second end is configured to engage a drive shaft, a cross-sectional area of the first end is the same as a cross-sectional area of a body of the hollow shaft, the second end is configured to be disposed within the drive shaft, and the hollow shaft is formed from a single piece of material; and
 a guide element coupled to the hollow shaft, wherein the first end is disposed within an opening of the guide element.

13. The stalk roller assembly of claim 12, wherein the stalk roller comprises a first plurality of blades coupled to an outer surface of the hollow shaft.

14. The stalk roller assembly of claim 12, wherein the hollow shaft comprises a plurality of openings configured to facilitate coupling the hollow shaft to a plurality of blades, and the plurality of blades is configured to be positioned along an outer surface of the hollow shaft.

15. The stalk roller assembly of claim 12, comprising one or more pins configured to engage the hollow shaft to block movement of the guide element relative to the hollow shaft.

16. The stalk roller assembly of claim 12, wherein the cross-sectional area of the first end is greater than a cross-sectional area of the second end.

17. The hollow shaft of claim 9, wherein the first end has a first outer cross-sectional shape, the second end has a second outer cross-sectional shape, and the first outer cross-sectional shape is different than the second outer cross-sectional shape.

18. The hollow shaft of claim 17, wherein the first outer cross-sectional shape is substantially square, the second outer cross-sectional shape is hexagonal, or a combination thereof.

19. The hollow shaft of claim 17, wherein the first outer cross-sectional shape is larger than the second outer cross-sectional shape.

20. The hollow shaft of claim 9, wherein a junction between the second portion and the third portion is chamfered.

* * * * *